No. 619,116. Patented Feb. 7, 1899.
E. R. BARBER.
COTTON GIN.
(Application filed Feb. 7, 1898.)
(No Model.)

WITNESSES:

INVENTOR
E. R. Barber.
BY
ATTORNEYS.

UNITED STATES PATENT OFFICE.

EUGENE ROBERTS BARBER, OF VALDOSTA, GEORGIA.

COTTON-GIN.

SPECIFICATION forming part of Letters Patent No. 619,116, dated February 7, 1899.

Application filed February 7, 1898. Serial No. 669,368. (No model.)

*To all whom it may concern:*

Be it known that I, EUGENE ROBERTS BARBER, of Valdosta, in the county of Lowndes and State of Georgia, have invented a new and Improved Cotton-Gin, of which the following is a full, clear, and exact description.

This invention is a cotton-gin having a belt with gripping-plates thereon which grasp the cotton to retain it on the belt, the belt passing beneath a stationary blade and the cotton at that point being acted on by a set of stripping-fingers, which stroke past the edge of the stationary blade to remove the cotton-seed.

This specification is the disclosure of one form of the invention, while the claims define the actual scope thereof.

Reference is to be had to the accompanying drawings, forming a part of this specification, in which similar characters of reference indicate corresponding parts in all the figures.

Figure 1:
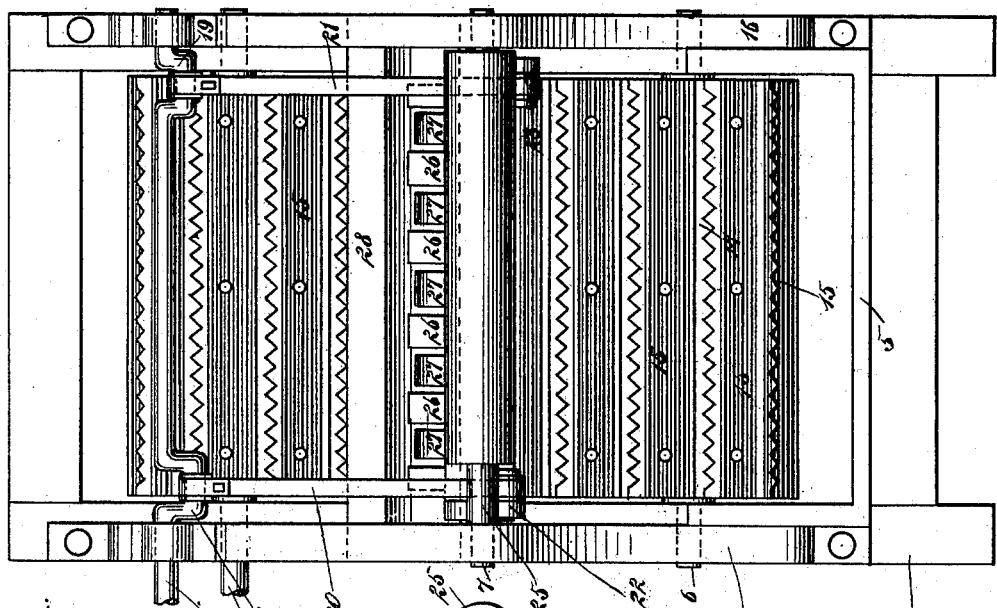
Figure 2:
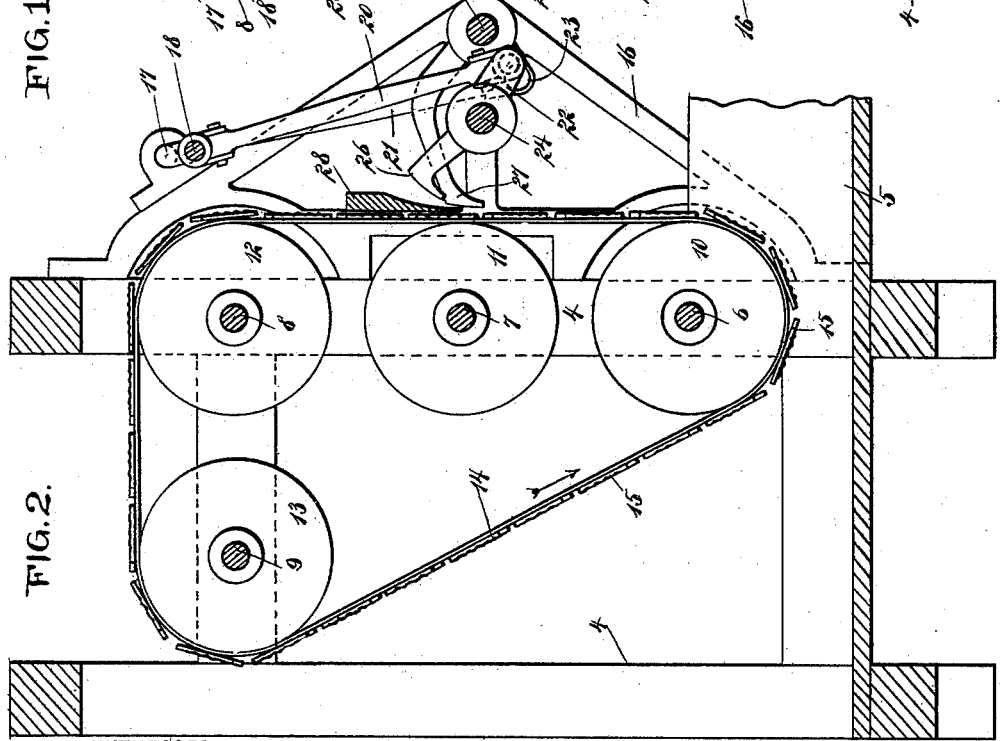
Figure 3:
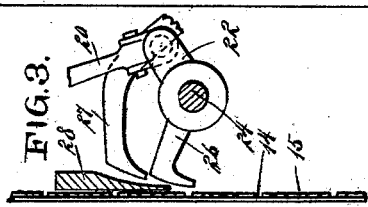

Figure 1 is a front elevation of the invention. Fig. 2 is a vertical longitudinal section thereof, and Fig. 3 is a fragmentary elevation of the stripping-fingers.

The mechanism of my invention may be sustained on a frame 4, having a trough or box 5 at its lower portion wherein is placed the cotton to be ginned. Turning in the frame 4 are four shafts, designated, respectively, 6, 7, 8, and 9, on which rollers 10, 11, 12, and 13 are respectively fixed. The rollers 10, 11, and 12 are arranged in vertical line with each other and the roller 13 is offset rearwardly from and arranged in a horizontal plane with the roller 12, so that the belt 14, passing over said rollers, will define approximately an inverted-right-angled triangle. The belt 14 is provided with a series of gripping-plates 15, having teeth on one edge and riveted to the belt by fastening devices passing through the center portions of the gripping-plates, so that the gripping-plates will be free at their edges. Consequently as the belt 14 turns over a corner roller—either one of the rollers 10, 12, or 13—the plates 15 will be separated at their edges from the belt. Then as the belt runs straight again the plates 15 will move back into close contact with the belt. The cotton is fed to the belt from the trough or box 5 at a point directly beneath the roller 10, so that as the belt leaves said roller the cotton is carried up with the belt. The rollers 10, 11, 12, and 13 may be driven by any suitable means. Two brackets 16 are attached to the frame 4 and project out forwardly therefrom. Mounted in the upper portions of the brackets 16 and extending between the same is a drive-shaft 17, having two cranks 18 and 19 formed thereon. The cranks 18 and 19 are respectively connected with pitmen 20 and 21, which in turn are respectively connected with crank-arms 22 and 23, extending toward each other and respectively from rock-shafts 24 and 25, mounted in the brackets 16. The crank-arms 22 and 23 are located at opposite ends of the shafts 24 and 25, as indicated in Fig. 1. To the shafts 24 and 25 picking-fingers 26 and 27, respectively, are attached. Each finger is provided with a curved or foot-shaped free end, and the fingers are arranged alternately—which is to say, the fingers 27 of the shaft 25 project between the several fingers 26. The shaft 17 being a revoluble shaft and the crank-arms 22 and 23 being disposed at opposite sides of their respective shafts, revolution of the shaft 17 will give the shafts 24 and 25 rocking movements out of time with each other, so that the fingers 27 move down as the fingers 26 move up, and vice versa. The fingers 26 and 27 project inward from the shafts into immediate proximity to the belt 14 and to the outer side of the roller 11. Located directly above the fingers 26 and 27 and fast with the brackets 16 of the frame is the stationary blade 28, which has a beveled lower edge, over which the fingers 26 and 27 stroke.

In using the invention the cotton is attached to the belt 14 by the action of the plates 15 at a point beneath the roller 10. Then as the belt moves upward the cotton is drawn beneath the stationary blade 28 and simultaneously subjected to the picking action of the rapidly-moving fingers 26 and 27. This effectually separates the seed from the cotton, which passes on with the belt beneath the blade 28 and up to the rollers 12 and 13. At this point the thus ginned cotton is disconnected from the belt, which disconnection may be effected by any desired means—for example, a blower acting on the cotton at either the roller 12 or 13. The plates 15 may have their outer faces corrugated or fluted, as shown, in order to more effectively engage the cotton.

Having thus described my invention, I claim as new and desire to secure by Letters Patent—

1. In a cotton-gin, the combination of a stationary blade, an endless belt provided with plates attached to the face thereof and adapted to catch the cotton and carry it along with the belt beneath the stationary blade, and oscillating picking-fingers stroking past the lower edge of the blade and over a portion of the belt, substantially as described.

2. In a cotton-gin, the combination of a belt provided with a series of gripping-plates, said plates being secured to the belt at their longitudinal centers, a stationary blade behind which the belt passes, and picking-fingers in front of the belt for removing the seed from the cotton, substantially as described.

3. In a cotton-gin, the combination of a belt provided with a series of gripping-plates secured thereto at their longitudinal centers and provided with teeth on their front edges, a stationary blade behind which the belt travels said blade having a beveled lower edge, and picking-fingers in front of the belt for removing the seed from the cotton substantially as described.

4. In a cotton-gin, the combination of an endless belt arranged to define approximately an inverted right-angled triangle and provided with toothed gripping-plates, a stationary blade in front of the vertical run of the belt and having a beveled lower portion, and alternately-operating picking-fingers in front of the belt and stationary blade, substantially as described.

5. In a cotton-gin, the combination of three vertically-arranged rollers, a fourth roller arranged in horizontal alinement with the uppermost one of the three rollers, an endless belt passing around the said rollers and provided with a series of toothed gripping-plates, a stationary blade in front of the belt and having its lower end terminating at about the center of the middle vertical roller, and picking-fingers in front of the belt, substantially as described.

6. In a cotton-gin, the combination with an endless traveling belt provided with a series of gripping-plates, of shafts mounted in front of the belt and each provided with picking-fingers, the fingers of one shaft projecting between the fingers of the other shaft, and means for rocking the said shafts out of time with each other, substantially as described.

7. In a cotton-gin, the combination of a belt capable of having the cotton attached thereto, a stationary blade past which the belt moves with the cotton attached, two oscillating shafts located adjacent to the blade, picking-fingers attached to the oscillating shafts, oppositely-disposed crank-arms respectively carried by the oscillating shafts, a pitman connected with each crank-arm, and a crank-shaft driving the pitmen.

EUGENE ROBERTS BARBER.

Witnesses:
W. COLEY,
W. A. RAY.